US012350690B2

(12) United States Patent
Chen

(10) Patent No.: US 12,350,690 B2
(45) Date of Patent: Jul. 8, 2025

(54) WATER OUTLET STRUCTURE ASSEMBLY

(71) Applicant: Nanchang Kohler Ltd., Nanchang (CN)

(72) Inventor: Shenghe Chen, Nanchang (CN)

(73) Assignee: NANCHANG KOHLER LTD., Nanchang (CN)

( * ) Notice: Subject to any disclaimer, the term of this patent is extended or adjusted under 35 U.S.C. 154(b) by 413 days.

(21) Appl. No.: 17/834,544

(22) Filed: Jun. 7, 2022

(65) Prior Publication Data

US 2023/0009593 A1 Jan. 12, 2023

(30) Foreign Application Priority Data

Jun. 22, 2021 (CN) ......................... 202121393305.5

(51) Int. Cl.

*B05B 1/18* (2006.01)
*B05B 3/02* (2006.01)
*B05B 3/04* (2006.01)

(52) U.S. Cl.

CPC .............. *B05B 1/185* (2013.01); *B05B 3/025* (2013.01); *B05B 3/0418* (2013.01)

(58) Field of Classification Search

CPC ........... B05B 1/18; B05B 1/185; B05B 3/025; B05B 3/028; B05B 3/04; B05B 3/0409;

(Continued)

(56) References Cited

U.S. PATENT DOCUMENTS 4,018,385 A * 4/1977 Bruno ...................... B05B 3/008 239/548
6,092,739 A 7/2000 Clearman et al.

(Continued)

FOREIGN PATENT DOCUMENTS

CN 101773880 A 7/2010
CN 109433438 3/2019

(Continued)

OTHER PUBLICATIONS

Extended European Search Report for EP Patent App. No. 22179221.1 dated Nov. 18, 2022, 7 pages.

(Continued)

*Primary Examiner* — Darren W Gorman
(74) *Attorney, Agent, or Firm* — FOLEY & LARDNER LLP

(57) ABSTRACT

The present disclosure relates to a fluid discharging assembly. The fluid discharging assembly includes a rotatable driving mechanism having at least two rotating eccentric shafts oppositely disposed about a center axis of the driving mechanism. The fluid discharging assembly includes a first slider having a first shaft hole coupled to a first of the at least two eccentric shafts and a second slider having a second shaft hole coupled to a second of the at least two eccentric shafts. The first slider includes a first through hole that receives a first fluid discharging pipe and the second slider includes a second through hole that receives a second fluid discharging pipe. The first fluid discharging pipe rotates at a first rotation by a rotation of the first slider and the second fluid discharging pipe rotates at a second rotation by a rotation of the second slider.

20 Claims, 5 Drawing Sheets

(58) Field of Classification Search
CPC ... B05B 3/0418; B05B 3/0422; B05B 3/0427; B05B 3/0445
See application file for complete search history.

(56) References Cited

U.S. PATENT DOCUMENTS

| | | | |
|---|---|---|---|
| 6,186,114 | B1 | 2/2001 | Nakamura |
| 6,199,771 | B1 | 3/2001 | Clearman et al. |
| 6,360,965 | B1 | 3/2002 | Clearman et al. |
| 7,111,795 | B2 | 9/2006 | Thong |
| 7,114,666 | B2 | 10/2006 | Luettgen et al. |
| 7,278,591 | B2 | 10/2007 | Clearman et al. |
| 7,416,139 | B2 | 8/2008 | Kah, Jr. |
| 7,946,512 | B2 * | 5/2011 | Schorn .................. B05B 3/0422 239/383 |
| 8,403,240 | B2 | 3/2013 | Chen |
| 8,418,935 | B2 | 4/2013 | Chen et al. |
| 8,632,020 | B2 | 1/2014 | Kah, Jr. |
| 9,015,697 | B2 | 4/2015 | Baker et al. |
| 9,067,222 | B2 | 6/2015 | Gransow et al. |
| 9,404,243 | B2 | 8/2016 | Cacka et al. |
| 9,815,069 | B2 | 11/2017 | Hou et al. |
| 9,815,070 | B2 | 11/2017 | Lin et al. |
| 9,821,327 | B2 | 11/2017 | Lin et al. |
| D842,431 | S | 3/2019 | Cacka et al. |
| 10,259,000 | B2 | 4/2019 | Yu et al. |
| D855,757 | S | 8/2019 | Caka et al. |
| 10,471,444 | B2 | 11/2019 | Hong |
| 10,478,837 | B2 | 11/2019 | Cacka et al. |
| 10,478,838 | B2 | 11/2019 | Lin et al. |
| 10,525,488 | B2 | 1/2020 | Cacka et al. |
| 10,576,479 | B2 | 3/2020 | Cai et al. |
| 10,792,678 | B2 | 10/2020 | Lu et al. |
| 10,799,889 | B2 | 10/2020 | Lin et al. |
| 10,875,038 | B2 | 12/2020 | Lin et al. |
| 10,946,395 | B2 | 3/2021 | Medeiros |
| 10,994,289 | B2 | 5/2021 | Cacka et al. |
| 11,014,101 | B2 | 5/2021 | Zhuo et al. |
| 11,084,047 | B2 | 8/2021 | Cacka et al. |
| 11,097,290 | B2 | 8/2021 | Wu et al. |
| 11,173,502 | B2 | 11/2021 | Cacka et al. |
| 11,213,837 | B2 | 1/2022 | Kajuch et al. |
| 11,278,919 | B2 | 3/2022 | Quinn et al. |
| 2016/0228887 | A1 * | 8/2016 | Lin ....................... B05B 3/0463 |
| 2019/0143348 | A1 | 5/2019 | Quinn et al. |
| 2019/0374959 | A1 | 12/2019 | Yu |
| 2020/0008627 | A1 | 1/2020 | Mori |
| 2020/0030827 | A1 | 1/2020 | Malert et al. |
| 2020/0038885 | A1 * | 2/2020 | Wu ........................... B05B 3/16 |
| 2020/0139386 | A1 | 5/2020 | Hong |
| 2020/0206754 | A1 | 7/2020 | Wu et al. |
| 2021/0031622 | A1 | 2/2021 | Murakami et al. |
| 2021/0129162 | A1 | 5/2021 | Quinn et al. |
| 2022/0032326 | A1 | 2/2022 | Cacka et al. |
| 2022/0062924 | A1 | 3/2022 | Ying et al. |
| 2022/0088623 | A1 | 3/2022 | Kajuch et al. |

FOREIGN PATENT DOCUMENTS

| | | | |
|---|---|---|---|
| DE | 20 2015 006 287 | U1 | 2/2016 |
| WO | WO-2007/011424 | A1 | 1/2007 |

OTHER PUBLICATIONS

Office Action issued in connection with EP Appl. No. 22179221.1 dated Dec. 18, 2024.

* cited by examiner

WATER OUTLET STRUCTURE ASSEMBLY

CROSS-REFERENCE TO RELATED PATENT APPLICATIONS

This application claims the benefit of and priority to Chinese Patent Application No. 202121393305.5, filed Jun. 22, 2021, the entire disclosure of which is incorporated by reference herein.

BACKGROUND

Various fluid dispensing devices, such as showerheads, can include various discharge modes in which fluid is dispensed from the device in a particular shape, pattern, or other characteristic. In some circumstances, a user may desire a massaging experience while showering. Therefore, there is a need for a massaging fluid dispensing device that produces a substantial water spray area and satisfying massaging effect.

SUMMARY

At least one aspect of the present disclosure is directed towards a fluid discharging assembly. The fluid discharging assembly includes a discharging structure having a fluid inlet cavity fluidly coupled to a fluid outlet cavity. The discharging structure includes a driving mechanism rotatably coupled to the fluid inlet cavity. The driving mechanism includes a gear set coupled to a first eccentric shaft and a second eccentric shaft oppositely disposed about a center axis of the gear set. The discharging structure includes a first slider rotatably coupled to the fluid outlet cavity. The first slider is coupled to the first eccentric shaft such that the first slider rotates with the first eccentric shaft. The discharging structure includes a second slider opposing the first slider and rotatably coupled to the fluid outlet cavity. The second slider is coupled to the second eccentric shaft such that the second slider rotates with the second eccentric shaft. The discharging structure includes a first fluid discharging pipe coupled to a through hole of the first slider and a second fluid discharging pipe coupled to a through hole of the second slider. Each of the first and second fluid discharging pipes are rotatably coupled to the discharging structure and penetrate outside the fluid outlet cavity to rotatably expel fluid at two distinct rotations.

At least one aspect of the present disclosure is directed towards a fluid discharging assembly. The fluid discharging assembly includes a rotatable driving mechanism having at least two rotating eccentric shafts oppositely disposed about a center axis of the driving mechanism. The fluid discharging assembly includes a first slider having a first shaft hole coupled to a first of the at least two eccentric shafts and a second slider having a second shaft hole coupled to a second of the at least two eccentric shafts. The first slider includes a first through hole that receives a first fluid discharging pipe and the second slider includes a second through hole that receives a second fluid discharging pipe. The first fluid discharging pipe rotates at a first rotation by a rotation of the first slider and the second fluid discharging pipe rotates at a second rotation by a rotation of the second slider.

At least one aspect of the present disclosure is directed towards a showerhead having a fluid discharging assembly. The fluid discharging assembly includes a rotatable driving mechanism having at least two rotating eccentric shafts oppositely disposed about a center axis of the driving mechanism. The fluid discharging assembly includes a first slider having a first shaft hole coupled to a first of the at least two eccentric shafts and a second slider having a second shaft hole coupled to a second of the at least two eccentric shafts. The first slider includes a first through hole that receives a first fluid discharging pipe and the second slider includes a second through hole that receives a second fluid discharging pipe. The first fluid discharging pipe rotates at a first rotation by a rotation of the first slider and the second fluid discharging pipe rotates at a second rotation by a rotation of the second slider.

DETAILED DESCRIPTION

Referring generally to the FIGURES, provided herein are fluid outlet assemblies that include various eccentric shafts to cause at least two discharging pipes (e.g., nozzles) to rotate at different rotations to provide a massaging effect.

Figure 1:
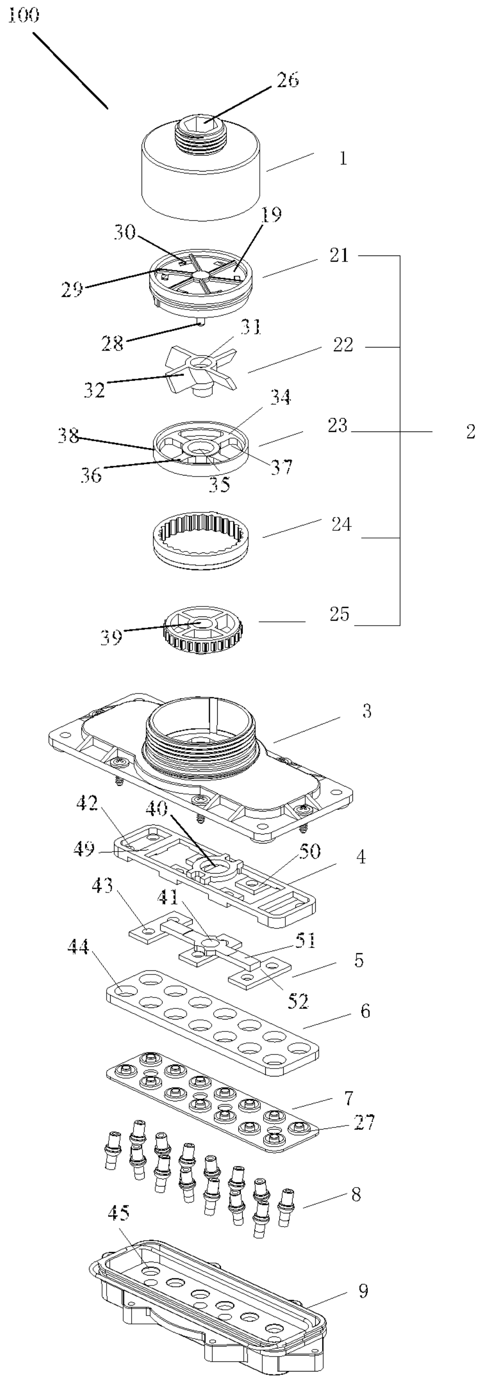
FIG. 1 is an exploded view of a discharging structural assembly, according to an exemplary embodiment.
Figure 4:
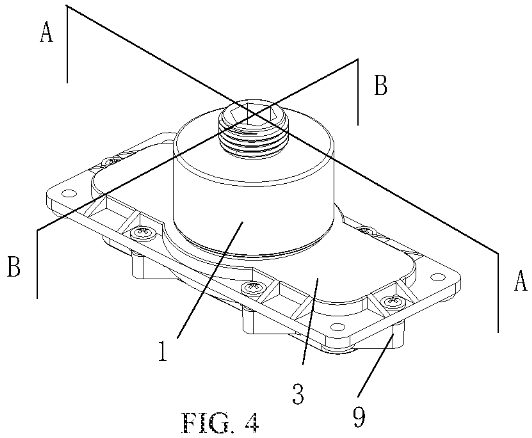
FIG. 4 is a rear perspective view of the discharging structural assembly shown in FIG. 1, according to an exemplary embodiment.

FIG. 1 is an exploded view of a discharging structural assembly 100 according to a first exemplary embodiment. FIG. 4 is a rear perspective view of the discharging structural assembly 100 in a coupled state. The discharging structural assembly 100 can be or can include a fluid discharging assembly which can be or can be used in various fluid discharging devices including, but not limited to, showerheads, faucets, spray heads, and/or other discharge devices.

Referring to FIG. 1 and FIG. 4, the discharging structural assembly 100 can include a connector 1 (e.g., a portion of a housing for the discharging structural assembly 100) that couples to a body 3 (e.g., another portion of the housing) to define a fluid pathway. The discharging structural assembly 100 can include a driving mechanism 2 disposed between the body 3 and the connector 1, a first slider 4 movably coupled to the body 3, a second slider 5 movably coupled to the body 3, at least two water discharging pipes 8 rotatably and/or movably coupled to the body 3, and a water outlet panel 9.

The connector 1, the body 3, and the water outlet panel 9 can be sequentially coupled. For example, the connector 1 and the body 3 can couple to define a water inlet cavity between the connector 1 and the body 3 (e.g., water or other fluid can flow and/or be kept within one or more spaces between the connector 1 and the body 3 when the connector 1 and the body 3 are coupled) and the body 3 can couple to the water outlet panel 9 to define a water outlet flow pathway (e.g., water or other fluid can flow and/or be kept within one or more spaces between the body 3 and the water outlet panel 9). The connector 1 can include an inlet 26 that can couple to a water source to provide fluid to the water inlet cavity. In some embodiments, the connector 1 is rigidly coupled to the body 3 by one or more threads. For example, an inner surface of the connector 1 can include an internal thread and an outer surface of the body 3 can include a corresponding external thread that can receive the internal threads. In some embodiments, the body 3 can rigidly couple to the water outlet panel 9 by one or more fasteners (e.g., screws, bolts, clips, etc.).

Referring to FIG. 1, the driving mechanism 2 of the discharging structural assembly 100 can be disposed within the water inlet cavity between the connector 1 and the body 3 and can include a water intake base 21, an eccentric impeller 22, a fixed base 23, a first gear 25, and a second gear 24. In some embodiments, the water intake base 21 can be disposed within a portion of the connector 1 and the body 3. A center portion of the water intake base 21 can include a mounting shaft 28. For example, the mounting shaft 28 can include any shaft, rod, axle, or the like that extends from the water intake base 21 and/or that penetrates through one or more of the remaining components of the driving mechanism 2 such that one or more components of the driving mechanism 2 are capable of rotating about the mounting shaft 28.

The water intake base 21 can include a plurality of guiding channels 29 (e.g., protrusions, extensions, ribs, etc.) evenly distributed in a circumferential direction about the mounting shaft 28. The water intake base 21 can include at least one guiding groove 30 (e.g., inclined hole, aperture or other water channel that is disposed at an angle relative to a surface 19 of the water intake base 21) positioned along a side of each guiding channel 29. For example, each guiding groove 30 can include an inclined (e.g., downward angle) water channel such that when water enters the connector 1 from the inlet 26, water is diverted by the guiding channels 29 to flow out through the guiding grooves 30 at an angle. The water can then be expelled towards one or more portions of the eccentric impeller 22. The water intake base 21 can be rigidly coupled to the connector 1 such that the water intake base 21 does not rotate relative to the connector 1.

In some embodiments, the water intake base 21 includes six guiding channels 29 evenly distributed about the surface 19 and the guiding channels 29 can include one or more through holes (e.g., guiding grooves 30) for water flow to pass through between the guiding channels 29. The mounting shaft 28 can be disposed at a center portion (e.g., at an intersection) of the six guiding channels 29 such that the mounting shaft 28 is positioned in a center of the water intake surface 19. This example is for illustrative purposes. The water intake base 21 can include more or less guiding channels 29 and/or guiding grooves 30 (e.g., one, two, three, four, five, etc.). In some embodiments, one guiding groove 30 is positioned on a side surface of each guiding channel 29 proximate an edge of the water intake base 21.

The eccentric impeller 22 can rotatably couple to the fixed base 23 between the fixed base 23 and the water intake base 21. For example, the fixed base 23 can rigidly couple to the water intake base 21 and the impeller 22 can include at least one shaft that penetrates through an aperture of the fixed base 23 such that the impeller 22 can rotate between the water intake base 21 and the fixed base 23. As an example, the mounting shaft 28 can sequentially penetrate through the eccentric impeller 22 and the fixed base 23 such that the fixed base 23 and the water intake base 21 can provide a mounting and rotating space for the eccentric impeller 22 (e.g., the eccentric impeller 22 is capable of rotating around the mounting shaft 28).

Figure 2:
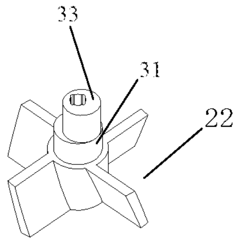
FIG. 2 is a front perspective view of an eccentric impeller of the discharging structural assembly of FIG. 1, according to an exemplary embodiment.

In some embodiments, the eccentric impeller 22 can include a central shaft 31 and a plurality of blades 32 evenly distributed in a circumferential direction of the central shaft 31. A first end of the central shaft 31 that faces the water intake base 21 can include or can be a through hole that can couple to the mounting shaft 28. A second end of the central shaft 31 that faces the fixed base 23 can be, can couple to, or can include an eccentric output shaft 33 as shown in FIG. 2, which depicts a front perspective view of the impeller 22. The eccentric output shaft 33 can be positioned off center from the central shaft 31 (e.g., close to a right side of the central shaft 31 in one position as shown in FIG. 2).

Referring back to FIG. 1, in some embodiments, the fixed base 23 can include a main surface 34 and a shaft hole 35 positioned in a center of the main surface 34. The shaft hole 35 can receive a portion of the central shaft 31 of the impeller 22. In some embodiments, the shaft hole 35 is larger in diameter than the central shaft 31 such that the impeller 22 can rotate relative to the fixed base 23 (e.g., the shaft hole 35 is a clearance hole for the central shaft 31). The fixed base 23 can include a plurality of supporting rods 36 evenly distributed between the shaft hole 35 and the main surface 34. The fixed base 23 can include through holes 37 for water flow disposed between the supporting rods 36. The fixed base 23 can include or can couple to a side connecting surface 38 that extends from the main surface 34 to form a cavity between the main surface 34 and the side connecting surface 38. In some embodiments, the eccentric impeller 22 can position within the cavity of the fixed base 23 between the main surface 34 and the side connecting surface 38 such that the impeller 22 can rotate within the cavity between the fixed base 23 and the water intake base 21.

The impeller 22 can rotate responsive to water being discharged from the water intake base 21. For example, water can pass through the angled guiding channels 29 such that water is expelled at an angle relative to an axial direction of the mounting shaft 28 which exerts a force upon the blades 32 of the impeller 22 which causes the eccentric impeller 22 to rotate. With this configuration, the water intake base 21 allows the driving mechanism 2 to be operated without an external force, which can save energy (e.g., as compared to having to use a manual or non-renewable energy source).

As described herein, the mounting shaft 28 can penetrate through the eccentric impeller 22 and the fixed base 23 such that the impeller 22 can rotate relative to the water intake base 21. The mounting shaft 28 can further penetrate through the first gear 25 to rotatably couple the first gear 25 to the water intake base 21. For example, the first gear 25 can include at least one shaft hole 39 to receive a portion of the eccentric output shaft 33 and/or a portion of the mounting shaft 28. In some embodiments, a diameter of the shaft hole 39 of the first gear 25 can be just less than, about equal to, or just greater than a diameter of the eccentric output shaft 33 such that the first gear 25 can rigidly couple to the eccentric output shaft 33 (e.g., such that the first gear 25 can rotate when the eccentric output shaft 33 rotates).

The first gear 25 and the second gear 24 can each include corresponding teeth such that the first gear 25 and the second gear 24 can mesh together. For example, the first gear 25 can be an internal gear and the second gear 24 can be an external gear such that the first gear 25 is located in the second gear 24. The first gear 25 can include one or more through holes for water to flow through the first gear 25. The first gear 25 can be smaller in pitch than the second gear 24 such that the first gear 25 and the second gear 24 can form a decelerating mechanism of the discharging structural assembly 100. When the eccentric impeller 22 rotates around the mounting shaft 28, the first gear 25 and the second gear 24 can form the differential gear deceleration. For example, the first gear 25 and the second gear 24 are coupled to form a transmission to reduce a rotation speed of the output shaft 33 of the eccentric impeller 22. The first gear 25 and the second gear 24 can reduce a rotation speed of the driving mechanism 2 to avoid an excessively rapid rotation speed, such that movement of the water discharging pipes 8 described herein is relatively soft. In some embodiments, the second gear 24 can be housed (e.g., enclosed) within the body 3.

Figure 3:
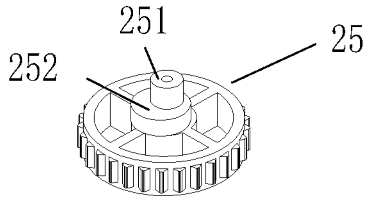
FIG. 3 is a front perspective view of an inner gear of the discharging structural assembly of FIG. 1, according to an exemplary embodiment.

As shown in FIG. 3, which depicts a front perspective view of the first gear 25, the first gear 25 can include or can couple to a first eccentric shaft 252 and a second eccentric shaft 251 that each extend away from the inlet 26 and towards the water outlet panel 9. The first eccentric shaft 252 and the second eccentric shaft 251 can each couple to the eccentric impeller 22. For example, as described herein, the eccentric impeller 22 can couple to the first gear 25 such that rotation of the eccentric impeller 22 can cause rotation of the first eccentric shaft 252 and the second eccentric shaft 251.

In some embodiments, the first eccentric shaft 252 and the second eccentric shaft 251 are sequentially coupled to the first gear 25. In some embodiments, the first slider 4 and the second slider 5 are sequentially coupled to the first gear 25 by the first eccentric shaft 252 and the second eccentric shaft 251, respectively, such that rotation of the first eccentric shaft 252 causes the first slider 4 to move and rotation of the second eccentric shaft 251 causes the second slider 5 to move. For example, the first eccentric shaft 252 can couple to a shaft hole 40 of the first slider 4 to move the first slider 4 in a circular motion and the second eccentric shaft 251 can couple to a shaft hole 41 of the second slider 5 to move the second slider 5 in a circular motion. The first eccentric shaft 252 can rigidly couple to the shaft hole 40 of the first slider 4 such that the off-center circular rotation of the first eccentric shaft 252 causes the first slider 4 to similarly rotate in a circular motion (e.g., slide along a circular or other two-dimensional path that corresponds to the movement of the first eccentric shaft 252 around the center axis of the mounting shaft 28). Similarly, the second eccentric shaft 251 can rigidly couple to the shaft hole 41 of the second slider 5 such that the off-center circular rotation of the second eccentric shaft 251 causes the second slider 5 to similarly rotate in a circular motion (e.g., slide along a circular or other two-dimensional path that corresponds to the movement of the second eccentric shaft 251 around the center axis of the mounting shaft 28). At the same time, the eccentric output shaft 33 of the eccentric impeller 22 can cause the first gear 25 to move within the second gear 24 so that the first slider 4 and the second slider 5 also move simultaneously in a side-to-side (e.g., sliding) motion while moving in a circular motion. For example, the additional rotation of the first gear 25 relative to the second gear 24 can cause the first slider 4 and the second slider 5 to slide in a direction perpendicular to an axial direction of the eccentric output shaft 33.

The first slider 4 can include a frame and a plurality of slider mounting plates 50 evenly distributed along a circumferential direction of the frame. The first slider 4 can include a plurality of (for example, eight) first through holes 42. The frame can include two partition plates 49 oppositely arranged on the frame. The frame can include four slider mounting plates 50 evenly distributed between the two partition plates 49. The four slider mounting plates 50 can be oppositely arranged in pairs and spaced with a gap. Each slider mounting plate 50 can include one through hole 42.

The second slider 5 can include a slider connecting plate 51 and three second slider mounting plates 52 evenly distributed along a longitudinal direction of the slider connecting plate 51. The slider mounting plate 52 can include two through holes 43 oppositely distributed. The second slider 5 can include a plurality of (for example, six) through holes 43.

In some embodiments, the first eccentric shaft 252 and the second eccentric shaft 251 are located at different and/or opposing positions relative to a center axis of the mounting shaft 28 such that the first eccentric shaft 252 and the second eccentric shaft 251 rotate at different (e.g., offset, opposing) rotations. With this configuration, the first slider 4 and the second slider 5 can rotate at offset rotations (e.g., the rotations may not be identical, the rotations can be equal and opposite).

Referring back to FIG. 1, the discharging structural assembly 100 can include a fixing plate 6 disposed between the sliders (e.g., the first slider 4 and the second slider 5) and the water outlet panel 9. In some embodiments, the first slider 4 and the second slider 5 can couple to the discharging structural assembly 100 between the fixing plate 6 and the body 3. In some embodiments, the fixing plate 6 and the water outlet panel 9 can each include a plurality of through holes 44, 45 evenly distributed about the fixing plate 6 and/or the water outlet panel 9 such that the water discharging pipes 8 (e.g., rigid nozzles) can sequentially couple to and penetrate through the through holes 44 in the fixing plate 6 and the through holes 45 in the water outlet panel 9 to extend beyond a surface of the water outlet panel 9. In some embodiments, a diameter of the through holes 44, 45 is greater than a diameter of the water discharging pipes 8 such that the water discharging pipes 8 can swing or make circular motion within the through holes. The through holes 44, 45 and the holes 42, 43 can each facilitate providing a rotational axis and/or point for the water discharging pipes 8.

In some embodiments, the discharging structural assembly 100 can include a sealing gasket 7 disposed between the fixing plate 6 and the water outlet panel 9. The sealing gasket 7 can include at least two elastic sealing rings 27 (e.g., O-rings or other types of sealing rings) arranged on the sealing gasket 7 such that the elastic sealing rings 27 can each receive a water discharging pipe 8. The elastic sealing rings 27 can elastically seal at least one water discharging pipe 8 to the first slider 4 (e.g., by one or more through holes 42 of the first slider 4) and at least one water discharging pipe 8 to the second slider 5 (e.g., by one or more through holes 43 of the second slider 5). With this configuration, a first subset of the water discharging pipes 8 can rigidly couple to the first slider 4 such that the first subset (e.g., eight) of the water discharging pipes 8 moves responsive to movement of the first slider 4 and a second subset (e.g., six) of the water discharging pipes 8 can rigidly couple to the second slider 5 such that the second subset of the water discharging pipes 8 moves responsive to movement of the second slider 5. Therefore, the first subset of water discharging pipes 8 and the second subset of water discharging pipes 8 can rotate and/or swing at different rotations such that water expelled from each subset provides a swirling, interlacing, and massaging effect. In some embodiments, the water discharging pipes 8 can be evenly distributed relative to the water outlet panel 9. In some embodiments, the water discharging pipes 8 can couple to the water outlet panel 9 at the same axial position (e.g., such that a center point of each water discharging pipe 8 is about equal relative to the water outlet panel 9 in an axial direction).

In some embodiments, the plurality of elastic sealing rings 27 can be evenly distributed on the sealing gasket 7 and each elastic sealing ring 27 can be oppositely arranged relative to the through holes 44, 45 of the fixing plate 6 and the water outlet panel 9 such that each elastic sealing ring 27 seals the water discharging pipes 8 in the through holes 44, 45. In some embodiments, the elastic sealing rings 27 can include one or more elastic materials (e.g., rubber or another elastomer) such that the elastic sealing rings 27 can deform to facilitate sealing the water discharging pipes 8 without affecting normal rotation or swing of the water discharging pipes 8.

Figure 5:
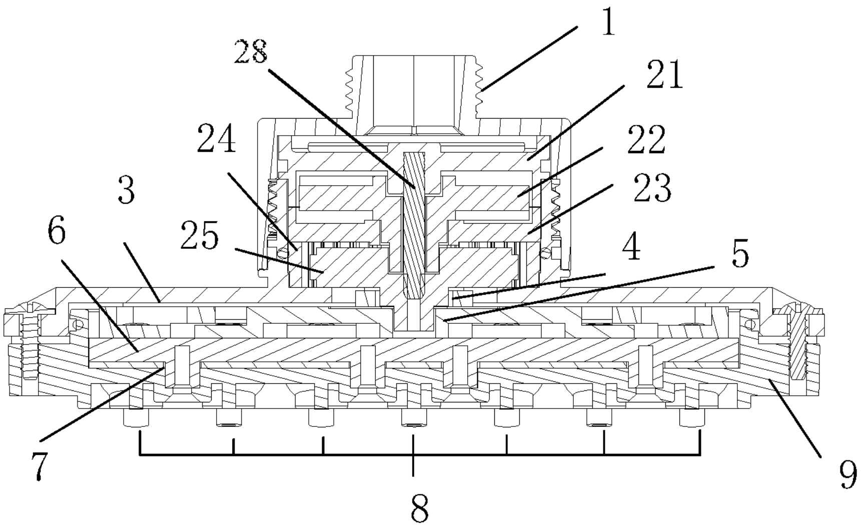
FIG. 5 is a cross-sectional view of the discharging structural assembly shown in FIG. 4 along line A-A, according to an exemplary embodiment.
Figure 6:
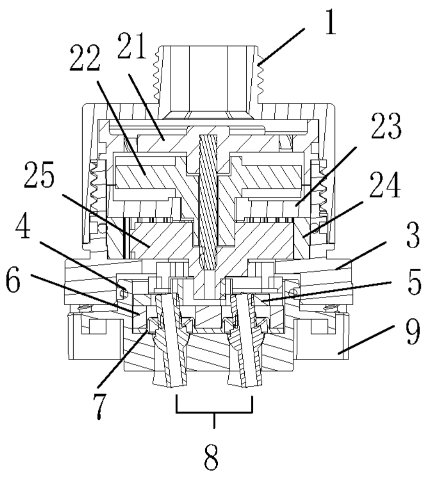
FIG. 6 is a cross-sectional view of the discharging structural assembly shown in FIG. 4 along line B-B, according to an exemplary embodiment.
Figure 7:
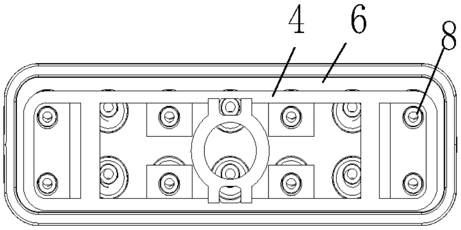
FIG. 7 is a front view of a first slider, a fixed base, and a water discharging pipes of the discharging structural assembly of FIG. 1 in a use state, according to an exemplary embodiment.
Figure 8:
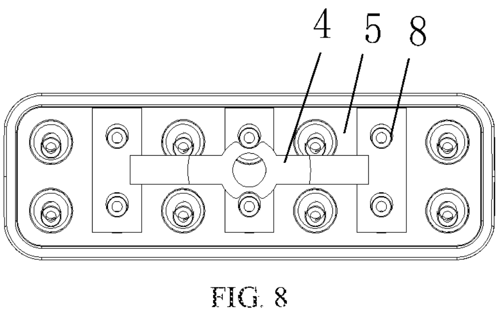
FIG. 8 is a front view of a second slider, the fixed base, and the water discharging pipes of the discharging structural assembly of FIG. 1 in a use state, according to an exemplary embodiment.

FIG. 5 depicts a cross-sectional view of the discharging structural assembly 100 along line A-A (shown in FIG. 4) and FIG. 6 is a cross-sectional view of the discharging structural assembly 100 along line B-B (shown in FIG. 4). FIG. 7 is a front view of the first slider 4, the fixing plate 6, and the water discharging pipes 8 in one example use state. FIG. 8 is a front view of the first slider 4, the second slider 5, and the water discharging pipes 8 in one example use state.

Referring to FIGS. 5-8, water or another fluid can enter the water inlet cavity of the connector 1 and drive the driving mechanism 2 to work. For example, the water flow through the water intake base 21 causes the impeller 22 to rotate relative to the fixed base 23. The rotation of the impeller 22 causes the first eccentric shaft 252 and the second eccentric shaft 251 to rotate which drives the first slider 4 to move and the second slider 5 to move, respectively.

A first of the water discharging pipes 8 can couple to the first slider 4 and a second of the water discharging pipes 8 can couple to the second slider 5 to receive, direct, and discharge the water flow in the water inlet cavity to an external environment. The different rotations of the water discharging pipes 8 causes at least two distinctly rotating water discharge paths to provide a massaging effect (e.g., swirling, overlapping water flow, multiple superimposed motions).

For example, when in use, water enters through the water inlet cavity between the connector 1 and the body 3 and acts on the driving mechanism 2. The driving mechanism 2 drives the first slider 4 and the second slider 5 to move in a circular motion, and the first slider 4 and the second slider 5 drive the water discharging pipes 8 above the first slider 4 and the second slider 5 to move synchronously. Since the first eccentric shaft 252 and the second eccentric shaft 251 are oppositely arranged, the discharging structural assembly 100 discharges water in periodic rotations. By using the above discharging structural assembly 100, the area for discharging water is increased as compared to a water discharging assembly that provides water in a straight path and/or a non-rotating path.

Figure 9:
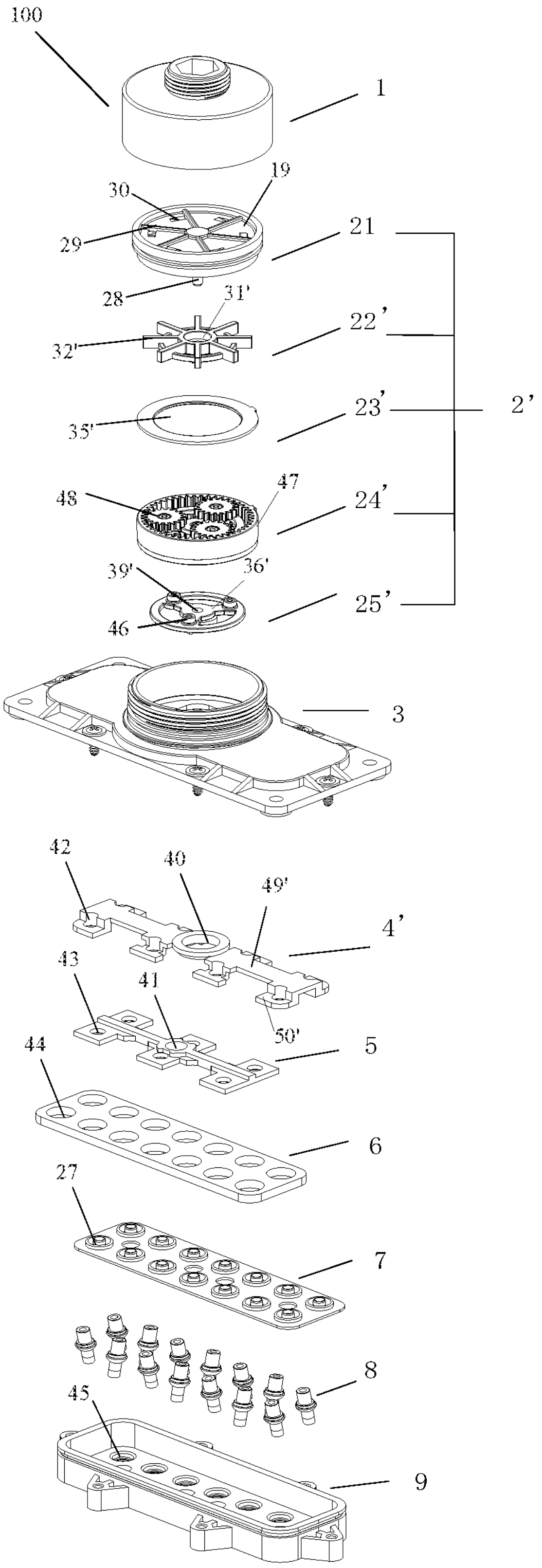
FIG. 9 is an exploded view of a discharging structural assembly, according to another exemplary embodiment.

FIG. 9 is an exploded view of the discharging structural assembly 100 according to a second exemplary embodiment. One or more portions of the second embodiment of the discharging structural assembly 100 may be identical to the first embodiment. For example, the connector 1, the body 3, the water intake base 21, the second slider 5, the fixing plate 6, the sealing gasket 7, the water discharging pipes 8, and/or the water outlet panel 9 may include the same configuration. Several components of the discharging structural assembly 100 of the second exemplary embodiment, such as the impeller 22' and the first slider 4', can include one or more features similar to the corresponding components of the discharging structural assembly 100 of the first exemplary embodiment.

In the exemplary embodiment shown in FIG. 9, the driving mechanism 2' can include a supporting plate 23', an impeller 22', and an eccentric output wheel 25'. In some embodiments, the supporting plate 23' can be fixed relative to the water intake base 21 such that the impeller 22' can rotate relative to the supporting plate 23' and the water intake base 21. The impeller 22' can include at least one shaft that penetrates through a portion of the supporting plate 23'. For example, the impeller 22' can include a central shaft 31' and a plurality of blades 32' evenly distributed along a circumferential direction of the central shaft 31'. The central shaft 31' can include a through hole that can couple to the mounting shaft 28 of the water intake base 21. In some embodiments, the supporting plate 23' can include a shaft hole 35' that is larger in diameter than the central shaft 31' such that the impeller 22' can rotate relative to the supporting plate 23' (e.g., the shaft hole 35' is a clearance hole for the central shaft 31').

The driving mechanism 2' can include an eccentric output wheel 25' and a planetary gear set 24'. The impeller 22' can couple to the eccentric output wheel 25' by the mounting shaft 28. For example, the mounting shaft 28 can sequentially penetrate through the through hole of the impeller 22', a through hole of the supporting plate 23', and through a through hole of the eccentric output wheel 25'. The impeller 22' can rotate around the mounting shaft 28.

Figure 10:
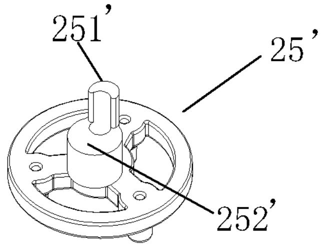
FIG. 10 is a front perspective view of an output shaft of the discharging structural assembly of FIG. 9, according to an exemplary embodiment.
Figure 11:
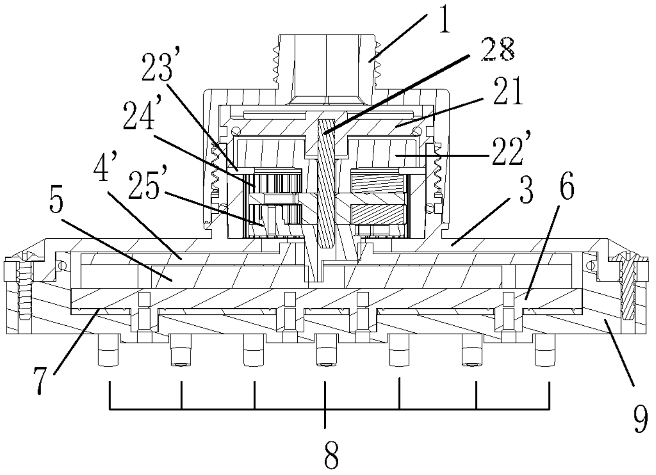
FIG. 11 is a cross-sectional view of the discharging structural assembly of FIG. 9, according to an exemplary embodiment.
Figure 12:
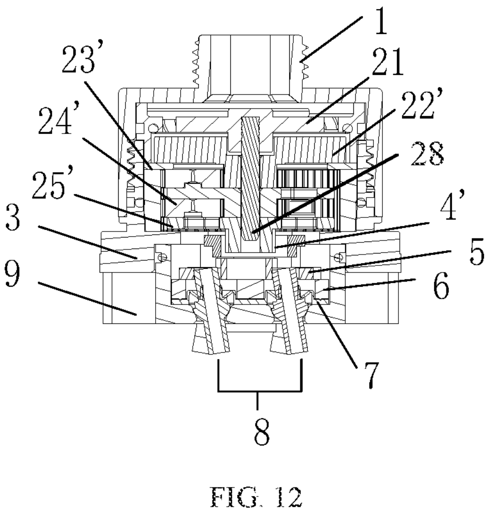
FIG. 12 is another cross-sectional view of the discharging structural assembly of FIG. 9, according to an exemplary embodiment.

As shown in FIG. 10, the eccentric output wheel 25' can include or can couple to a first eccentric shaft 252' and a second eccentric shaft 251' that are sequentially connected onto the eccentric output wheel 25' and that each extend away from the inlet 26 and towards the water outlet panel 9. In some embodiments, the first slider 4' and the second slider 5 are sequentially coupled to the eccentric output wheel 25' by the first eccentric shaft 252' and the second eccentric shaft 251', respectively, such that rotation of the first eccentric shaft 252' causes the first slider 4' to move and rotation of the second eccentric shaft 251' causes the second slider 5 to move.

In some embodiments, the eccentric output wheel 25' can include a central shaft (e.g., a rod, shaft, axis, or axle extending from the output wheel 25' in a direction away from the inlet 26) and a shaft hole 39' arranged in a center of the central shaft. The eccentric output wheel 25' can include a plurality of supporting rods 36' (e.g., material connecting the shaft hole 39' to a perimeter of the wheel 25') evenly distributed between the shaft hole 39' and the central shaft. The eccentric output wheel 25' can include through holes for water to pass through arranged between the supporting rods 36'. Each of the supporting rods 36' that face the supporting plate 23' can include a supporting shaft 46. A side of the central shaft that faces the body 3 can sequentially include the first eccentric shaft 252' and a second eccentric shaft 251', as shown in FIG. 10. As shown in FIG. 10, the first eccentric shaft 252' can be arranged close to a left side of a center axis of the output wheel 25' and the second eccentric shaft 251' can be arranged close to a right side of a center axis of the output wheel 25' in a first position (e.g., the first eccentric shaft 252' can oppose the second eccentric shaft 251').

The planetary gear set 24' can include planetary carrier 47 and a plurality of planetary gears 48 evenly distributed in the planetary carrier that are each meshed together. For example, the planetary gear set 24' can include three planetary gears 48 that are each coupled to a corresponding supporting shaft 46 of the eccentric output wheel 25'. With this configuration, rotation of the planetary gears 48 causes rotation of the eccentric output wheel 25'. The planetary carrier 47 can be disposed in the connector 1. The impeller 22' can drive the planetary gears 48 to rotate in the planetary carrier 47 and the planetary gears 48 can couple to the eccentric output wheel 25'. The planetary gear set 24' can be mounted between the impeller 22' and the eccentric output wheel 25'. The planetary gear set 24' can facilitate slowing an output speed of the impeller 22' to avoid an excessively rapid rotation speed. The planetary carrier 47 can include at least one through hole for water to pass.

The first slider 4' can include a first mounting shaft hole 40 and a plurality of first through holes 42 evenly distributed along the first mounting shaft hole 40. The second slider 5 can include a second mounting shaft hole 41 and a plurality of second through holes 43 evenly distributed along the second mounting shaft hole 41. The first through holes 42 and the second through holes 43 can each receive the water discharging pipes 8.

The first slider 4' can include a connecting plate 49' and four slider mounting plates 50' evenly distributed along a longitudinal direction of the connecting plate. Two first through holes 42 are oppositely distributed in each slider mounting plate 50'. The first slider 4 can include a plurality of (for example, eight) through holes 42.

In some embodiments, the water discharging pipes 8 coupled in the first through holes 42 and the water discharging pipes 8 coupled in the second through holes 43 can extend in a direction that intersect one another. For example, the first through holes 42 and the second through holes 43 can be offset from one another such that the central axes of the water discharging pipes 8 intersect at least at one point during rotation of the water discharging pipes 8 (e.g., such that the water expelled from the two subsets of water discharging pipes 8 intersects at least at one point during rotation). In some embodiments, all the water discharging pipes 8 coupled in the first through holes 42 can extend at the same angle and all the water discharging pipes 8 coupled in the second through holes 43 can extend at the same angle. With this configuration, the directions of discharging water of the water discharging pipes 8 are different, such that water is discharged to a greater spray area than if water was directed in just a downward direction.

An example use process of the discharging structural assembly 100 is further described hereinafter. In the first embodiment, the water discharging pipes 8, the sealing gasket 7, the fixing plate 6, the second slider 5 and the first slider 4 are sequentially coupled to the water outlet panel 9. The body 3 is covered on the water outlet panel 9 and relatively fixed. The first gear 25, the second gear 24, the fixed base 23, the eccentric impeller 22, and the water intake base 21 are sequentially put into the body 3 and the connector 1 is covered on the body 3 and fixed to complete the assembly 100.

When in use, the connector 1 receives water from the inlet 26 from an external fluid source (e.g., water supply). Water enters through the water inlet 26 of the connector 1 and passes through the guiding grooves 30 of the water intake base 21 to discharge water at an angle which drives the eccentric impeller 22 to rotate. The eccentric impeller 22 rotates to drive the first gear 25 to rotate within the second gear 24. Meanwhile, the first eccentric shaft 252 and the second eccentric shaft 251 respectively drive the first slider 4 and the second slider 5 to move in a circular motion. Since the eccentric impeller 22 acts on the first gear 25, the first slider 4 and the second slider 5 also swing while moving in a circular motion. The first slider 4 and the second slider 5 drive the water discharging pipes 8 above the first slider 4 and the second slider 5 to move synchronously. Since the first eccentric shaft 252 and the second eccentric shaft 251 are oppositely disposed about a center axis of the first gear 25, the first slider 4 and the second slider 5 rotate at different rotations (e.g., at different locations), so that the discharging structural assembly 100 causes the water discharging pipes 8 to rotate and swing periodically and repeatedly as the pipes 8 discharge water.

In the second embodiment, the water discharging pipes 8, the sealing gasket 7, the fixing plate 6, the second slider 5 and the first slider 4 are sequentially coupled to the water outlet panel 9. The body 3 is covered on the water outlet panel 9 and relatively fixed. The eccentric output wheel 25', the planetary gear set 24', the supporting plate 23', the impeller 22' and the water intake base 21' are sequentially coupled to the body 3 and the connector 1 is covered on the body 3 and fixed to complete the assembly.

When in use, the connector 1 receives water from the inlet 26 from an external fluid source (e.g., water supply). Water enters through the water inlet 26 of the connector 1 and passes through the guiding grooves 30 of the water intake base 21 to discharge water at an angle which drives the eccentric impeller 22' to rotate. The impeller 22' rotates to drive the planetary gear set 24' to rotate which drives the eccentric output wheel 25' to rotate. Meanwhile, the first eccentric shaft 252' and the second eccentric shaft 251' respectively drive the first slider 4' and the second slider 5 to move in a circular motion. The first slider 4' and the second slider 5 drive the water discharging pipes 8 respectively coupled to the first slider 4' and the second slider 5 to synchronously move in a circular motion. Since the first eccentric shaft 252' and the second eccentric shaft 251' are oppositely disposed about a center axis of the eccentric output wheel 25', the first slider 4' and the second slider 5 rotate at different rotations (e.g., at different locations), so that the discharging structural assembly 100 causes the water discharging pipes 8 to rotate periodically and repeatedly as the pipes 8 discharge water.

To make the objects, the technical solutions, and the advantages of the present disclosure clearer, the present disclosure is further described in detail hereinafter with reference to the specific embodiments and the drawings. Same parts are denoted by same reference numerals. It should be noted that the terms “front”, “back”, “left”, “right”, “up”, and “down” used in the following descriptions refer to the directions in the drawings. The terms “inner” and “outer” used respectively refer to directions facing or far away from a geometric center of a specific part.

Those of ordinary skills in the art should understand that: those described above are only specific embodiments of the application, but are not intended to limit the present disclosure. Any modifications, equivalent substitutions and improvements made in the subject of the present disclosure shall all fall within the scope of protection of the present disclosure.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the eccentric output wheel 25' of the exemplary embodiment described with reference to FIGS. 9-12 may be incorporated in the exemplary embodiment of the outlet structure assembly 100 described with reference to FIGS. 1-8. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fluid discharging assembly, comprising:

a discharging structure including a fluid inlet cavity fluidly coupled to a fluid outlet cavity;

a driving mechanism rotatably coupled to the fluid inlet cavity, the driving mechanism including a gear set coupled to a first eccentric shaft and a second eccentric shaft oppositely disposed about a center axis of the gear set;

a first slider rotatably coupled to the fluid outlet cavity, wherein the first slider is coupled to the first eccentric shaft such that the first slider rotates with the first eccentric shaft;

a second slider opposing the first slider and rotatably coupled to the fluid outlet cavity, wherein the second slider is coupled to the second eccentric shaft such that the second slider rotates with the second eccentric shaft;

a first fluid discharging pipe coupled to a through hole of the first slider;

a second fluid discharging pipe coupled to a through hole of the second slider; and wherein each of the first and second fluid discharging pipes are rotatably coupled to the discharging structure and penetrate outside the fluid outlet cavity to rotatably expel fluid at two distinct rotations.

2. The fluid discharging assembly according to claim 1, wherein:

the discharging structure includes a connector and a body coupled to the connector to define the fluid inlet cavity; and the discharging structure includes a fluid outlet panel and the fluid outlet cavity is defined between the body and the fluid outlet panel.

3. The fluid discharging assembly according to claim 2, wherein:

the fluid outlet panel includes a first through hole to receive the first fluid discharging pipe and a second through hole to receive the second fluid discharging pipe; and the through holes of the first slider, the second slider, and the fluid outlet panel provide a rotating axis for at least one of the first fluid discharging pipe and the second fluid discharging pipe.

4. The fluid discharging assembly according to claim 2, wherein:

a fixing plate is disposed within the fluid outlet cavity; and the first fluid discharging pipe and the second fluid discharging pipe penetrate through the fixing plate and are rotatably coupled to the fluid outlet panel.

5. The fluid discharging assembly according to claim 4, wherein:

a sealing gasket is disposed between the fixing plate and the fluid outlet panel; and the sealing gasket includes a first elastic sealing ring configured to receive the first fluid discharging pipe and a second elastic sealing ring configured to receive the second fluid discharging pipe.

6. The fluid discharging assembly according to claim 1, wherein:

a fluid intake base is disposed in the fluid inlet cavity; and the fluid intake base includes a plurality of angled through holes to expel fluid at an angle.

7. The fluid discharging assembly according to claim 6, wherein:

a center of the fluid intake base includes a mounting shaft configured to penetrate through the driving mechanism; and the driving mechanism is configured to rotate around the mounting shaft.

8. The fluid discharging assembly according to claim 7, wherein the fluid intake base includes a plurality of guiding channels evenly distributed in a circumferential direction relative to the mounting shaft and at least one of the plurality of angled through holes is disposed on a side of each guiding channel.

9. The fluid discharging assembly according to claim 2, wherein:

the driving mechanism includes a fixed base and an impeller rotatably coupled to the fixed base; and the impeller is disposed between the fixed base and the connector and includes at least one eccentric shaft that penetrates through the fixed base to couple with a first gear of the gear set.

10. The fluid discharging assembly according to claim 9, wherein:

the first gear is configured to mesh with and rotate relative to a second gear of the gear set that surrounds the first gear; and an outer diameter of the first gear is smaller than an outer diameter of the second gear.

11. The fluid discharging assembly according to claim 1, wherein:

the driving mechanism includes a supporting plate and an impeller rotatably coupled to the supporting plate;

the supporting plate opposes a fluid intake base; and the impeller is disposed between the supporting plate and the fluid intake base and includes a shaft that penetrates through the supporting plate.

12. The fluid discharging assembly according to claim 11, wherein:

the impeller is coupled to an eccentric output wheel; and the first eccentric shaft and the second eccentric shaft are coupled to the eccentric output wheel in sequence.

13. The fluid discharging assembly according to claim 12, wherein:

the driving mechanism includes a planetary gear set disposed in the fluid inlet cavity;

the planetary gear set includes a planetary carrier and a plurality of planetary gears evenly distributed in the planetary carrier and meshed together;

the plurality of planetary gears are coupled to the eccentric output wheel; and the impeller drives the plurality of planetary gears to rotate in the planetary carrier.

14. The fluid discharging assembly according to claim 1, wherein:

the first slider includes a first mounting shaft hole and a plurality of first through holes evenly distributed relative to the first mounting shaft hole;

the second slider includes a second mounting shaft hole and a plurality of second through holes evenly distributed relative to the second mounting shaft hole; and the plurality of first through holes includes the through hole that receives the first fluid discharging pipe and the plurality of second through holes includes the through hole that receives the second fluid discharging pipe.

15. The fluid discharging assembly according to claim 1, wherein:

the first fluid discharging pipe coupled in the through hole of the first slider extends in a first rotational direction;

the second fluid discharging pipe coupled in the through hole of the second slider extends in a second rotational direction; and the first rotational direction and the second rotational direction intersect at least at one point when the first fluid discharging pipe and the second fluid discharging pipe rotate.

16. A fluid discharging assembly, comprising:

a rotatable driving mechanism including a gear set coupled to at least two rotating eccentric shafts offset from a center axis of the driving mechanism;

a first slider having a first shaft hole coupled to a first of the at least two eccentric shafts;

a second slider having a second shaft hole coupled to a second of the at least two eccentric shafts;

wherein the first slider includes a first through hole configured to receive a first fluid discharging pipe and the second slider includes a second through hole configured to receive a second fluid discharging pipe; and wherein the first fluid discharging pipe rotates at a first rotation by a rotation of the first slider and the second fluid discharging pipe rotates at a second rotation by a rotation of the second slider.

17. The fluid discharging assembly of claim 16, wherein the driving mechanism comprises:

an impeller having an eccentric output shaft;

a first gear of the gear set coupled to the impeller and having the first of the at least two eccentric shafts and the second of the at least two eccentric shafts; and wherein the first gear causes the rotation of the first slider and the second slider.

18. The fluid discharging assembly of claim 17, wherein the first gear rotates within a second gear of the gear set that is larger than the first gear to cause the first slider and the second slider to simultaneously swing.

19. The fluid discharging assembly of claim 16, wherein the driving mechanism comprises:

an impeller having an output shaft;

a planetary gear coupled to the output shaft and having a plurality of gears;

wherein each gear of the plurality of gears couples to an output wheel; and wherein the output wheel includes the first of the at least two eccentric shafts and the second of the at least two eccentric shafts.

20. A showerhead, comprising:

a fluid discharging assembly, comprising:

a rotatable driving mechanism including a gear set coupled to at least two rotating eccentric shafts offset from a center axis of the driving mechanism;

a first slider having a first shaft hole coupled to one of the at least two eccentric shafts and including a first through hole configured to receive a first fluid discharging pipe; and a second slider having a second shaft hole coupled to a second of the at least two eccentric shafts and including a second through hole configured to receive a second fluid discharging pipe;

wherein movement of the first slider along a first two-dimensional path causes rotation of the first fluid discharging pipe, and movement of the second slider along a second two-dimensional path causes rotation of the second fluid discharging pipe.

* * * * *